United States Patent [19]

Colles

[11] 4,257,064

[45] Mar. 17, 1981

[54] WIDEBAND LINEAR VIDEO CONTRAST CONTROL

[75] Inventor: Joseph H. Colles, Oceanside, Calif.

[73] Assignee: Hughes Aircraft Company, Culver City, Calif.

[21] Appl. No.: 122,637

[22] Filed: Feb. 19, 1980

[51] Int. Cl.³ ............................................. H04N 5/20
[52] U.S. Cl. ................................................ 358/169
[58] Field of Search ...................... 358/169; 307/264; 330/277, 278

[56] References Cited

U.S. PATENT DOCUMENTS

| | | |
|---|---|---|
| 3,240,874 | 3/1966 | Schreiner . |
| 3,804,981 | 4/1974 | Avins . |
| 3,969,579 | 7/1976 | Logan et al. . |
| 4,013,975 | 3/1977 | Kataoka et al. . |
| 4,125,789 | 11/1978 | Van Schoiack . |

FOREIGN PATENT DOCUMENTS 2021023  11/1971  Fed. Rep. of Germany ........... 358/169

Primary Examiner—Robert L. Richardson
Attorney, Agent, or Firm—Robert M. Wallace; W. H. MacAllister

[57] ABSTRACT

The nonlinearity between the gate voltage of a first field effect transistor and its source-to-drain impedance is compensated for by a feedback differential amplifier circuit using a reference field effect transistor identical to the first field effect transistor. Linear control is exercised through a potentiometer controlling the voltage on the first of two inputs to the differential amplifier. The other input of the differential amplifier senses the voltage drop across the source and drain of the reference transistor. The output of the differential amplifier is applied to the first transistor gate and as feedback to the reference transistor gate.

7 Claims, 2 Drawing Figures

WIDEBAND LINEAR VIDEO CONTRAST CONTROL

TECHNICAL FIELD

This invention permits the contrast of a video signal from coaxial cable to be varied in a linear manner without changing the resistance in which the cable is terminated from the characteristic impedance of the cable and is useful generally in video systems requiring manual contrast control such as video projectors and televisions.

BACKGROUND OF THE INVENTION

Contrast control in video systems is achieved by increasing or diminishing the amplitude variation of the video signal to increase or decrease the contrast of the video image produced by the signal. One problem is that the video signal is supplied through a coaxial cable in most systems, and contrast control is provided by a variable resistor connected between the coaxial cable and the video system. As is well known in the art, unless the coaxial cable is terminated in its characteristic impedance, spurious reflections of the video signal will occur at the boundary between the coaxial cable and the video system to which it is attached. Thus, adjustment of the variable resistor in order to change the video contrast will necessarily change the impedance in which the coaxial cable is terminated, which may cause the spurious reflections of the video signal. If it is desired to control the video contrast at a location which is removed by a substantial distance from the termination of the coaxial cable at the input to the video system, the variable resistor must be installed at the distant location and the video signal must travel an additional length of cable corresponding to at least twice the distance between the video system input and the location of the variable resistor. The additional cable length represents an increased capacitance which impairs system performance, as is well known to those skilled in the art. This latter problem may be overcome by substituting a field effect transistor at the video system input for dividing the voltage of the video signal supplied to the video system across the source and drain of the transistor. The gate voltage of the field effect transistor may be varied by a variable dc voltage source at the distant location, thus permitting contrast control over a long distance without increasing the distance traveled by the video signal. However, it is not possible to vary the video contrast in a linear manner using a field effect transistor because the source to drain resistance of the field effect transistor is a nonlinear function of its gate voltage.

SUMMARY OF THE INVENTION

This invention permits the contrast of the video signal to be varied in a highly linear manner at any distance from the input of the video system without requiring the video signal to travel additional cable length and without changing the impedance in which the coaxial cable is terminated. The invention varies the amplitude of the incoming video signal using a voltage dividing field effect transistor at the video system input. The nonlinearity between the gate voltage of the field effect transistor and its source to drain impedance is compensated for by a feedback differential amplifier circuit using a reference field effect transistor identical to the voltage dividing field effect transistor. Linear contrast control is exercised through a potentiometer controlling the voltage on the first of two inputs to the differential amplifier. The other input of the differential amplifier senses the voltage drop across the source and drain of the reference transistor. The output of the differential amplifier is applied to the voltage dividing transistor gate and as feedback to the reference transistor gate. The differential amplifier generates a voltage at its output which controls the voltage drop across the reference transistor applied to the second input of the differential amplifier to be the same as the voltage controlled by the potentiometer on the first input to be differential amplifier. Because the potentiometer voltage applied to the first input of the differential amplifier varies linearly with the movement of the potentiometer, the voltage drop across the reference field effect transistor is precisely controlled by the differential amplifier output to also vary linearly with the movement of the potentiometer. The reference transistor and the voltage divider transistor are of identical characteristics so that, inasmuch as the differential amplifier output is applied to the gates of both transistors, the voltage drop across the voltage dividing transistor must also vary linearly with the movement of the potentiometer, causing the video contrast to vary linearly with movement of the potentiometer.

In addition to the linear control afforded by the invention, temperature drift in the source-to-drain voltage drop across the voltage dividing transistor is automatically compensated by an identical temperature drift in the voltage drop across the reference transistor which forces the output voltage of the differential amplifier to change with the temperature drift so that the video contrast does not vary from the contrast selected according to the position of the potentiometer despite any temperature drift. Another advantage of the invention is that the coaxial cable may be terminated in its characteristic impedance and a buffer circuit may be imposed between the termination resistor and the voltage divider transistor so that variation of the video contrast does not vary the termination impedance of the cable, thus substantially eliminating the possibility of spurious reflections or oscillation of the video signal at the cable termination.

BRIEF DESCRIPTION OF THE DRAWINGS

The invention is best understood by reference to the accompanying drawings of which.

DETAILED DESCRIPTION OF THE INVENTION

Figure 1:
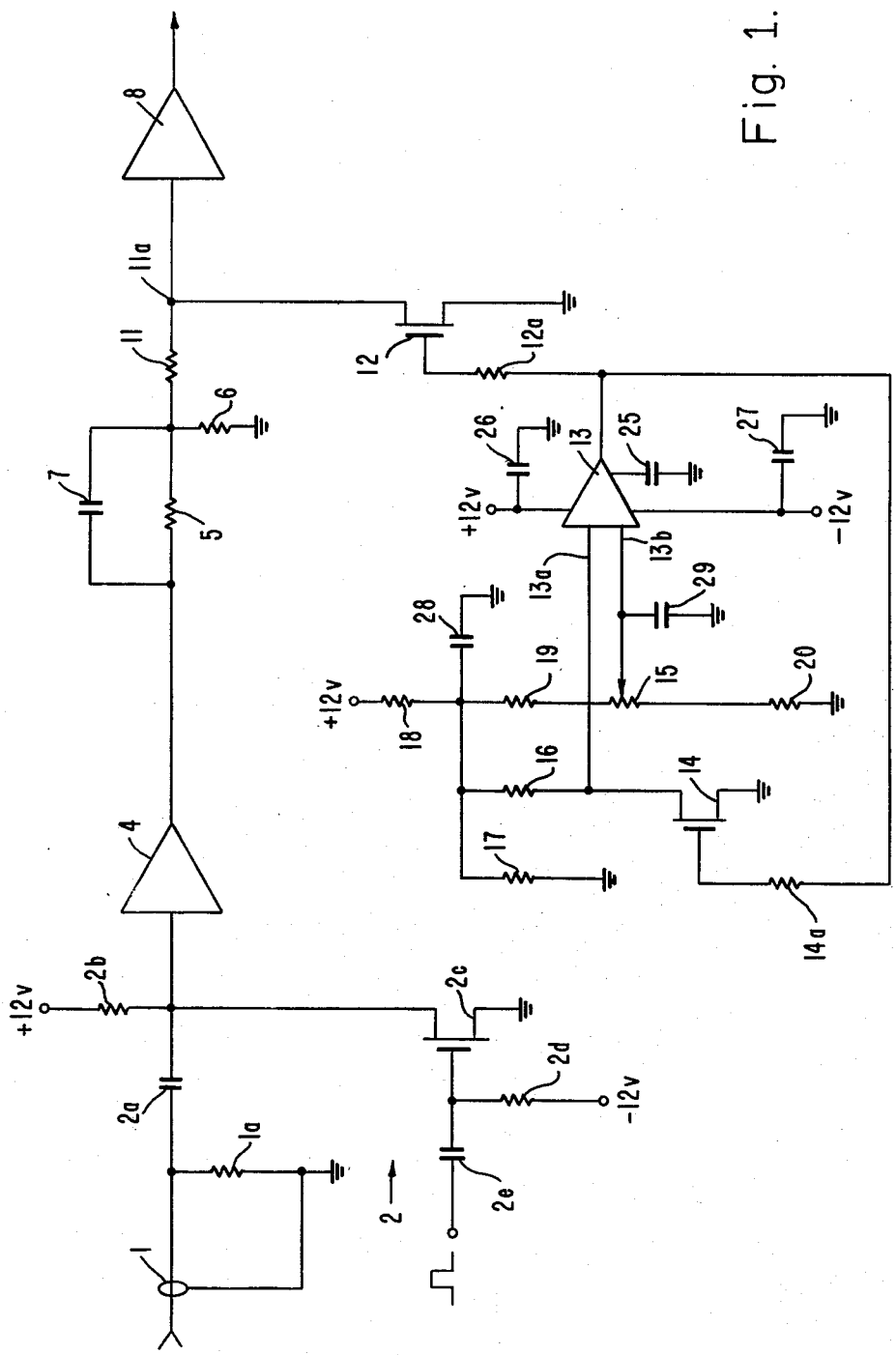
FIG. 1 is a schematic diagram of the video contrast control of the present invention.

Referring to the schematic diagram of FIG. 1, a video signal is carried by a coaxial cable 1 which is terminated at the input to a video system by a termination resistor 1a having a resistance equal to the characteristic impedance of the coaxial cable 1. A back porch clamp circuit 2 of the type well known in the art includes a capacitor 2a, a voltage dividing resistor 2b, a control field effect transistor 2c, a voltage dividing resistor 2d and a coupling capacitor 2e. The back porch clamp circuit functions to clamp the dc level of the back porch of an incoming standard-format video signal to a particular dc level in a manner well known to those skilled in the art. A buffer amplifier 4 is provided to isolate the termination resistor 1a from succeeding stages of the circuit. A divide-by-five attenuator circuit comprising the voltage dividing resistors 5 and 6 and a peaking capacitor 7 (connected in parallel with the voltage dividing resistor 5) is provided to reduce the dynamic range of the incoming video signal. The video signal is amplified to its original dynamic range by the amplifier 8.

A variable dividing network comprises voltage dividing resistor 11 and a voltage dividing field effect transistor 12. In order to vary the contrast of the video signal fed to the output amplifier 8, the source-to-drain resistance of the transistor 12 is decreased to decrease the video contrast and is increased in order to increase the video contrast. Preferably, the field effect transistor 12 is an n-channel device so that the video contrast is increased by increasing the negative voltage applied to the gate of the transistor 12 and is decreased by decreasing the negative voltage applied to the gate of the transistor 12. One advantage of this arrangement is that the source-to-drain resistance of the transistor 12 is much greater than the resistance of the termination resistor 1a so that variation of the gate voltage of the transistor 12 does not substantially affect the impedance in which the cable 1 is terminated. Thus, the cable will always be terminated in its characteristic impedance, typically 75 ohms, and no spurious oscillations will be caused by varying the video contrast. Another advantage of this arrangement is that the contrast may be varied at a distance without lengthening the cable distance traveled by the video signal by simply varying the gate voltage of the transistor 12 using a distant variable d.c. voltage source connected over a long conductor to the gate of the transistor 12.

A significant disadvantage of the foregoing arrangement is that the source-to-drain resistance of the transistor 12 (which determines the video contrast) varies in a nonlinear manner with the gate voltage of the transistor 12. In order to compensate for the nonlinearity between the gate voltage and the source-to-drain voltage of the transistor 12, the output of a differential amplifier 13 controls the gate voltage of the transistor 12. The output of the differential amplifier 13 is determined by the voltage difference between its two input terminals 13a, 13b. The positive terminal 13a senses the source-to-drain voltage drop across a reference field effect transistor 14 having its gate voltage also controlled by the output of the differential amplifier 13. The negative input 13b senses the voltage on the arm of a contrast control potentiometer 15. Preferably, the transistors 12 and 14 have identical characteristics. Thus, as the potentiometer 15 is moved to adjust the video contrast, the output of the differential amplifier applied to the gates of the transistors 12 and 14 moves accordingly in order to match the voltage drop across the transistor 14 to the changing voltage on the arm of the potentiometer 15 so that the voltage difference between the two inputs, 13a, 13b is minimized. Therefore, because the voltage on the arm of the potentiometer 15 varies linearly with the manual adjustment of the potentiometer 15, the voltage drop across the transistor 14 must also vary linearly with the manual adjustment of the potentiometer 15. Preferably, the transistors 12 and 14 comprise a dual package and are identical. Therefore, because the differential amplifier 13 applies the same output voltage to the gates of both transistors 12 and 14, the voltage drop across the source and drain of the transistor 12 (which determines the video contrast) also varies linearly with the manual adjustment of the potentiometer 15.

Preferably, the differential amplifier is biased between positive and negative 12 volts so that its output voltage has a dynamic range between −12 volts and +12 volts. A voltage dividing network comprising resistors 16, 17 and 18 connects the source of the transistor 14 to a 12 volt bias voltage source. Another voltage dividing network comprising the resistors 18, 19, 20 and the potentiometer 15 determines the range of voltages applied on the arm of the potentiometer to the differential amplifier input 13b. In the preferred embodiment, the maximum setting of the potentiometer 15 applies 11/12 volt to the input terminal 13b while the minimum setting of the potentiometer 15 applies 1/12 volt to the input terminal 13b. Preferably, the input terminal 13a is the positive terminal of the differential amplifier while the input terminal 13b is the negative terminal of the differential amplifier, although the circuit may be modified by a skilled worker so that the reverse is true. This modification may include exchanging the polarities of the voltage sources and changing the polarity of the transistors 12, 14.

A capacitor 25 is provided at the output of the amplifier 13 to stabilize or slow down fluctuations in the differential amplifier output. Filter capacitors 26, 27, 28, 29 are provided to remove fluctuations in the d.c. voltage at various points in the circuit.

As the resistance of the potentiometer 15 is increased, the voltage on the negative input terminal 13b of the differential amplifier 13 increases so that the amplifier senses an increased negative difference between its inputs and applies a more negative voltage from its output to the gates of the transistors 12 and 14. Because these transistors are n-channel devices, their source-to-drain resistances increase. This increase continues until the voltage drop across the reference transistor 14 applied to the positive input 13a of the differential amplifier 13 equals the voltage applied to the negative input by the potentiometer 15. The voltage drop across the voltage divider transistor 12 increases accordingly, thus increasing the amplitude of the video signal on voltage dividing node 11a and increasing the video contrast. Conversely, if the resistance of the potentiometer 15 is decreased, the voltage on the negative input of the differential amplifier 13 decreases, causing the differential amplifier 13 to sense a positive difference between its inputs and to decrease the amount of negative voltage applied to the transistors 12 and 14. This decrease continues until the voltage drop across the source and drain of the reference transistor 14 has decreased to decrease the voltage on the positive input of the differential amplifier 13 to equal the voltage on its negative input. The voltage drop across the source and drain of the voltage dividing transistor 12 decreases accordingly, thus decreasing the amplitude of the video signal on the voltage dividing node 11a to decrease the video contrast.

Figure 2:
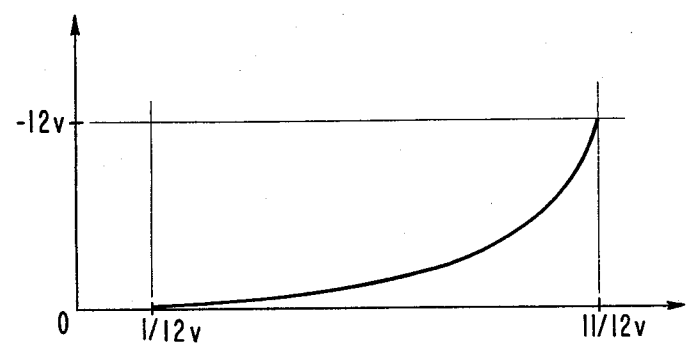
FIG. 2 is a graph of the differential amplifier output as a function of the voltage on the arm of the potentiometer applied to the first input of the differential amplifier of FIG. 1.

Referring to the plot of FIG. 2, the ordinate represents the output voltage of the differential amplifier 13 while the abcissa represents the voltage on the arm of the potentiometer 15. Although the curve illustrated in FIG. 2 is not necessarily an accurate representation of the differential amplifier output voltage, it does show the essential features of that function. Specifically, when the voltage on the arm of the potentiometer 15 is at its minimum value of 1/12 volts, the voltage drop across the reference transistor 14 is minimized because the differential amplifier 13 minimizes the amount of negative voltage applied to the gate of the transistor 14 in order to match the voltages on the positive and negative inputs of the differential amplifier 13. When the voltage on the arm of the potentiometer 15 is at its maximum value of 11/12 volt, the negative voltage output of the differential amplifier 13 is at a maximum value in order to maximize the voltage drop across the reference transistor 14 by increasing its source to drain resistance. Preferably, the gain of the differential amplifier 13 is approximately 45,000. Therefore, in order to maintain the output voltage plotted in FIG. 2, only a small voltage difference must be maintained between the positive and negative inputs of the differential amplifier. However, this voltage difference is negligible because the amplifier gain is very high. The voltage difference between the positive and negative inputs is equal to the output voltage of the amplifier 13 divided by its gain, 45,000. Therefore, the differential amplifier will maintain the voltage drop across the reference transistor 14 equal to the voltage on the arm of the potentiometer 15 to within a small error difference approximately equal to the differential amplifier output voltage divided by the amplifier gain of 45,000. Because the gain of the differential amplifier is very large, the system error is negligible.

The following is a list of the preferred value or part number of each component enumerated in the exemplary schematic diagram of FIG. 1. Each part number is referenced in the I.C. MASTER, published by United Technical Publications.

| NUMERAL | COMPONENT VALUE OR PART NUMBER |
|---|---|
| 1a | 75 ohms |
| 2a | 1 μF |
| 2b | 10 M-ohms |
| 2c | 2N485BA (Part No.) |
| 2d | 24 K-ohms |
| 2e | 1 μF |
| 4 | LH0002 (Part No.) |
| 5 | 100 ohms |
| 6 | 20 ohms |
| 7 | 68 pf |
| 11 | 1 K-ohm |
| 12 | E430 (Part No.) |
| 12a | 1 K-ohm |
| 13 | HA911 (Part No.) |
| 14 | E430 (Part No.) |
| 14a | 1 K-ohm |
| 15 | 10 K-ohms potentiometer |
| 16 | 1 K-ohm |
| 17 | 100 ohms |
| 18 | 1 K-ohm |
| 19 | 1 K-ohm |
| 20 | 1 K-ohm |
| 25 | 0.1 μF |
| 26 | 0.1 μF |
| 27 | 0.1 μF |
| 28 | 100 μF |
| 29 | 0.1 μF |

Thus, the wideband video contrast control of the invention uses a voltage dividing field effect transistor which permits the contrast to be varied without changing the termination impedance of the input cable and a differential amplifier referenced to a second field effect transistor which permits the contrast to be varied in a linear manner. A temperature drift in the source-to-drain voltage of the voltage dividing transistor 12 will be accompanied by an equal temperature drift in the source-to-drain voltage of the reference transistor 14, which will be sensed and compensated for by the differential amplifier 13 automatically. Therefore, the invention provides a stable linear contrast control over a wide temperature range.

What is claimed is:

1. A circuit for linearly varying signal amplitude comprising:
    a signal receiving voltage dividing network including a voltage dividing transistor having a first source, first drain and first gate, said signal receiving voltage dividing network having a voltage across said first source and drain proportional to the potential of said first gate;
    a reference voltage dividing network including a reference transistor comprising a second source, second drain and second gate, said reference voltage dividing network having a voltage drop across said second source and drain proportional to the potential of said second gate;
    a manual control voltage dividing network including a potentiometer having a moveable arm, said arm having a potential controlled by the position of said arm; and
    a differential amplifier having positive and negative input terminals and an output terminal, said output terminal controlling the voltage on said first and second gates, one of said input terminals being connected to receive the source-to-drain voltage of said reference transistor and the other of said input terminals connected to said potentiometer arm.

2. In a video system receiving an input signal from a transmission line having a signal conductor and a return conductor, a highly linear contrast control providing a constant termination impedance to said transmission line, comprising:
    a termination resistor connected between said signal conductor and said return conductor;
    an output node;
    a series resistance connected between said signal conductor of said transmission line and said output node;
    a first transistor having its source and drain connected between said output node and said return conductor;
    a second transistor;
    a potentiometer having an arm;
    means for applying operating potentials across the source and drain of said second transistor and across said potentiometer; and
    a differential amplifier including a positive input, a negative input and an output, one of said inputs connected to said potentiometer arm, the other of said inputs connected to receive the source-to-drain voltage of said second transistor and the output of said differential amplifier applied to the gates of said first and second transistors.

3. The device of claim 1 or 2 wherein said transistors are matched dual packaged field effect transistors.

4. The device of claim 1 or 2 wherein said differential amplifier has a gain of 45,000.

5. The device of claim 2 further comprising a buffer amplifier connected between said signal conductor and said output node.

6. The device of claim 1 or 2 further comprising a capacitor connected between said differential amplifier output and ground so as to increase the stability of said differential output.

7. The device of claim 2 wherein the source-to-drain resistance of said first transistor is greater than the resistance of said termination resistor.

* * * * *